(12) United States Patent
Ogawa

(10) Patent No.: US 8,807,504 B2
(45) Date of Patent: Aug. 19, 2014

(54) DIAMETER ACCEPTANCE MECHANISM FOR CUP HOLDER AND CUP HOLDER USING THE SAME

(75) Inventor: Atsushi Ogawa, Columbus, OH (US)

(73) Assignee: Nifco Inc., Yokohama-shi (JP)

( * ) Notice: Subject to any disclaimer, the term of this patent is extended or adjusted under 35 U.S.C. 154(b) by 212 days.

(21) Appl. No.: 13/138,795

(22) PCT Filed: Mar. 30, 2010

(86) PCT No.: PCT/JP2010/055764
§ 371 (c)(1),
(2), (4) Date: Dec. 12, 2011

(87) PCT Pub. No.: WO2010/113980
PCT Pub. Date: Oct. 7, 2010

(65) Prior Publication Data
US 2012/0091303 A1    Apr. 19, 2012

(30) Foreign Application Priority Data
Apr. 1, 2009  (JP) .................................. 2009-089570

(51) Int. Cl.
*B60N 3/10*    (2006.01)
(52) U.S. Cl.
CPC ..................... *B60N 3/106* (2013.01)
USPC ................... 248/311.2; 248/154; 297/188.14; 220/737
(58) Field of Classification Search
CPC ..................... B60N 3/10; A47K 1/08
USPC ........... 248/149, 154, 311.2, 316.3, 314, 312, 248/312.1, 316.2, 316.4, 316.5; 224/926; 220/282, 737; 297/188.14
See application file for complete search history.

(56) References Cited

U.S. PATENT DOCUMENTS

| | | | | |
|---|---|---|---|---|
| 5,749,554 | A * | 5/1998 | Avila et al. ................. | 248/311.2 |
| 6,749,167 | B2 * | 6/2004 | Kaupp et al. ............... | 248/311.2 |
| 6,758,452 | B1 * | 7/2004 | Salenbauch et al. ....... | 248/311.2 |
| 7,380,762 | B2 * | 6/2008 | Takeichi .................... | 248/311.2 |
| 7,416,161 | B2 * | 8/2008 | Shin ........................... | 248/311.2 |
| 7,487,945 | B2 * | 2/2009 | Liu et al. .................... | 248/311.2 |
| 7,597,300 | B2 * | 10/2009 | Harada ...................... | 248/311.2 |
| 7,789,265 | B2 * | 9/2010 | Kearney et al. ............ | 220/737 |
| 7,866,620 | B2 * | 1/2011 | Kaemmer .................. | 248/311.2 |
| 8,113,477 | B2 * | 2/2012 | Kaemmer .................. | 248/311.2 |
| 2004/0021048 | A1 * | 2/2004 | Schaal ........................ | 248/310 |
| 2005/0274862 | A1 * | 12/2005 | Takeichi .................... | 248/311.2 |

(Continued)

FOREIGN PATENT DOCUMENTS

| DE | 202006013840 U1 * | 12/2006 |
|---|---|---|
| JP | 2005-349959 | 12/2005 |

(Continued)

*Primary Examiner* — Terrell McKinnon
*Assistant Examiner* — Eret McNichols
(74) *Attorney, Agent, or Firm* — Manabu Kanesaka

(57) ABSTRACT

A diameter acceptance mechanism for a cup holder has a base, a contact member, and an urging device (for example, one torsion coil spring). The contact member has at least a hollow first flap member supported movably into and out from an open part of the base and having a projection orifice facing a cup insertion part, and a second flap member fitted into a hollow part of the first flap member and supported movably into and out from the projection orifice. The second flap member projects from the projection orifice to contact with an outer perimeter of a cup inserted into the cup insertion part.

4 Claims, 7 Drawing Sheets

(56) References Cited

U.S. PATENT DOCUMENTS

| | | | |
|---|---|---|---|
| 2006/0043249 A1* | 3/2006 | Han | 248/311.2 |
| 2006/0076468 A1* | 4/2006 | Shin | 248/311.2 |
| 2007/0075205 A1* | 4/2007 | Shin et al. | 248/311.2 |
| 2010/0090079 A1* | 4/2010 | Choi | 248/311.2 |
| 2010/0200720 A1* | 8/2010 | Kaemmer | 248/311.2 |

FOREIGN PATENT DOCUMENTS

| | | |
|---|---|---|
| JP | 2006-001428 | 1/2006 |
| JP | 2007-084022 | 4/2007 |
| JP | 2008-213588 | 9/2008 |
| JP | 2009-035038 | 2/2009 |
| KR | 747356 B1 * | 8/2007 |

* cited by examiner

DIAMETER ACCEPTANCE MECHANISM FOR CUP HOLDER AND CUP HOLDER USING THE SAME

TECHNOLOGICAL FIELD

The present invention relates to a diameter acceptance mechanism for cup holder and a cup holder using the same. A contact member for contacting with a cup inserted into the cup holder is made as two or more stages, whereby the range of allowance of diameters of cups can be enlarged.

BACKGROUND TECHNOLOGY

There is conventionally known a diameter acceptance mechanism for cup holder, in which a contact member for contacting with a cup, inserted into the cup holder is made as one stage (for example, see Patent Document 1, paragraph [009]).

PRIOR ART DOCUMENTS

Patent Documents

Patent Document 1: Japanese Unexamined Patent Publication No. 2006-1428

OUTLINE OF THE INVENTION

Problem to be Solved by the Invention

However, with the abovementioned conventional diameter acceptance mechanism, because the contact member is one stage, there is a problem that the depth in the non-projected direction of the contact member is increased as the amount of projection of the contact member is increased.

The present invention was created in consideration of the abovementioned problem of the prior art, and an object thereof is to make as two or more stages the contact member for contacting with a cup inserted into the cup holder, whereby the range of allowance of diameters of cups can be enlarged.

Means for Solving the Problem

The present invention is characterized by the following points.

First, the diameter acceptance mechanism for cup holder has the following configuration.

(1) Base

The base is fixed to the cup holder, and has an open part facing a cup insertion part of the cup holder.

(2) Contact Member

The contact member is supported movably into and out from the open part of the base, and is projected into the cup insertion part to contact with an outer perimeter of a cup inserted into the cup insertion part.

(3) Urging Device (for Example, One Torsion Coil Spring)

The urging device (for example, a torsion coil spring) is disposed between the base and the contact member, and is used for urging the contact member in the direction to project from the open part.

A torsion coil spring is given as an example of the urging device, but the urging device is not limited to this, and a sheet spring, or the like, also may be used. Also, one torsion coil spring is used, but the number is not limited to this, and a plurality also may be used.

Second, the contact member has at least the following configuration.

(4) First Flap Member

The first flap member is a hollow article supported movably into and out from the open part of the base and having a projection orifice facing the cup insertion part.

(5) Second Flap Member

The second flap member is fitted into the hollow part of the first flap member and supported movably into and out from the projection orifice, and projects from the projection orifice to contact with an outer perimeter of a cup inserted into the cup insertion part.

The contact member is projected in two stages, being the first and second flap members, but the number is not limited to this, and three or more stages also may be used.

The present invention may have the following characteristics.

First, the urging device is configured with one torsion coil spring.

Second, one end part of the torsion coil spring contacts with the base, and the other end part contacts with the second flap member.

Thus, because the first and second flap members can be projected using one torsion coil spring, not only can the number of parts be reduced, but also a diameter acceptance mechanism having a simple configuration can be provided.

The present invention may have the following characteristics.

The contact member and the urging device (for example, a torsion coil spring) are assembled and unitized on the base.

A unitized diameter acceptance mechanism can thus be provided.

The present invention may have the following characteristics.

The diameter acceptance mechanism is assembled on a cup holder.

An optimal diameter acceptance mechanism for the cup holder can thus be provided.

Effect of the Invention

Because the present invention is configured in the above manner, the contact member for contacting with a cup inserted into the cup holder is made as two or more stages, whereby the range of allowance of diameters of cups can be enlarged.

That is, according to the present invention, the configuration is made such that the second flap member is fitted in nested form into the hollow part of the first flap member, whereby the amount of projection of the contact member can be increased without increasing the depth in the stored direction.

EMBODIMENT OF THE INVENTION

In the figures, numeral 10 indicates a cup holder. The cup holder 10 is installed, for example, in a vehicle compartment not illustrated, and a beverage can, PET bottle, bottle, glass, or other cup C is inserted therein.

The place of installation of the cup holder 10 is not limited to the inside of a vehicle compartment.

Figure 1:
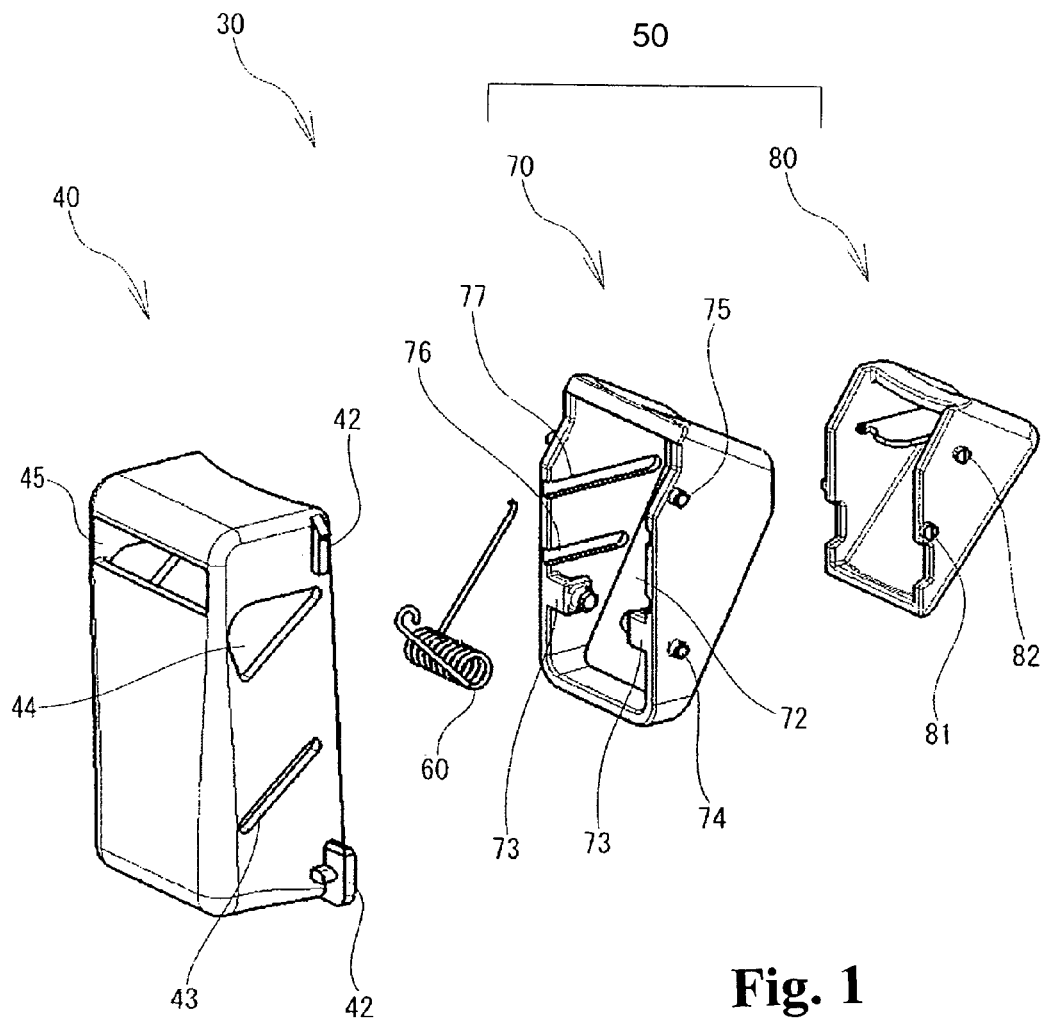
FIG. 1 is an exploded perspective view of a diameter acceptance mechanism.
Figure 2:
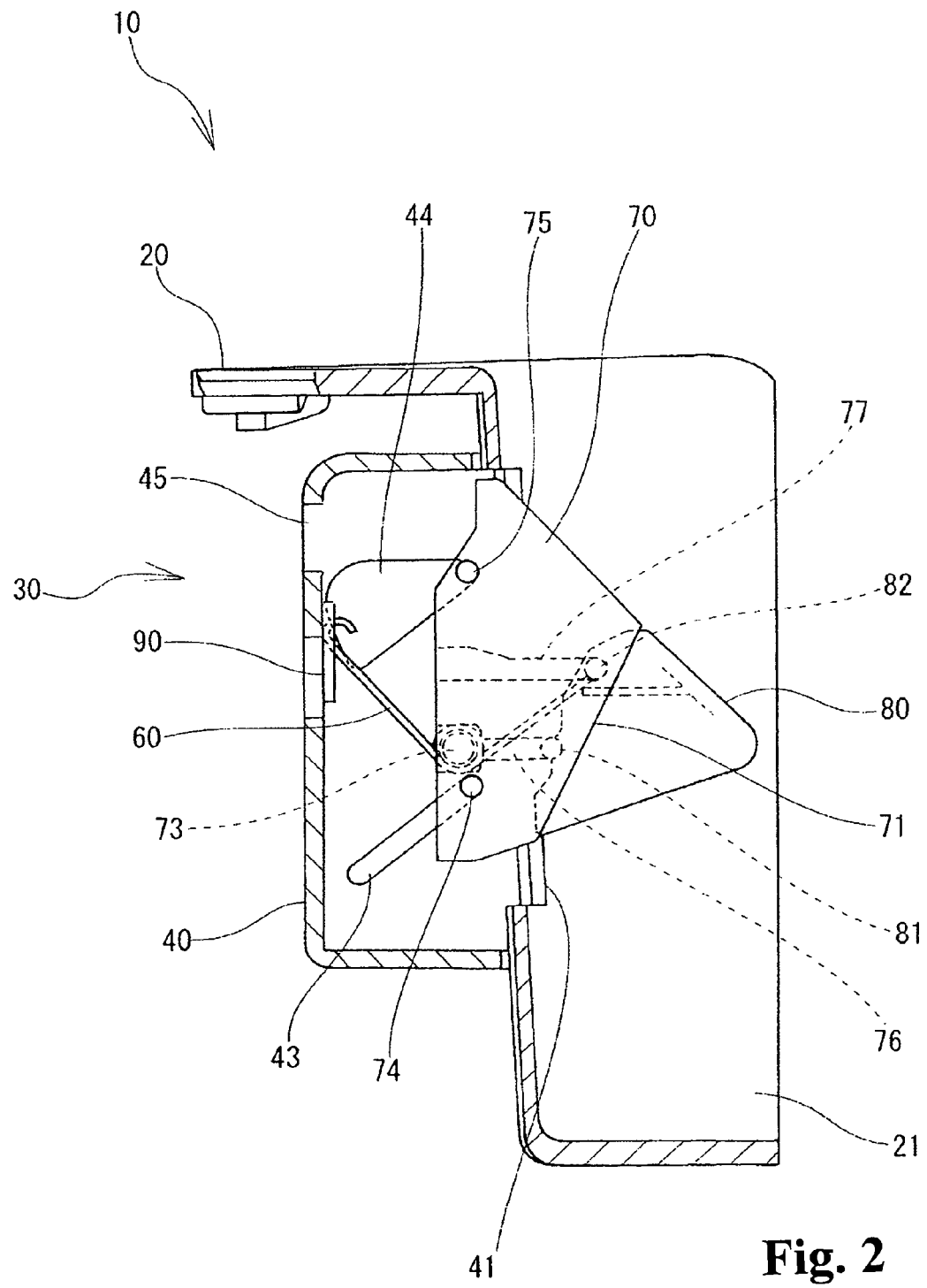
FIG. 2 is a partial cross-sectional view of a cup holder for describing the operating states of the diameter acceptance mechanism.
Figure 3:
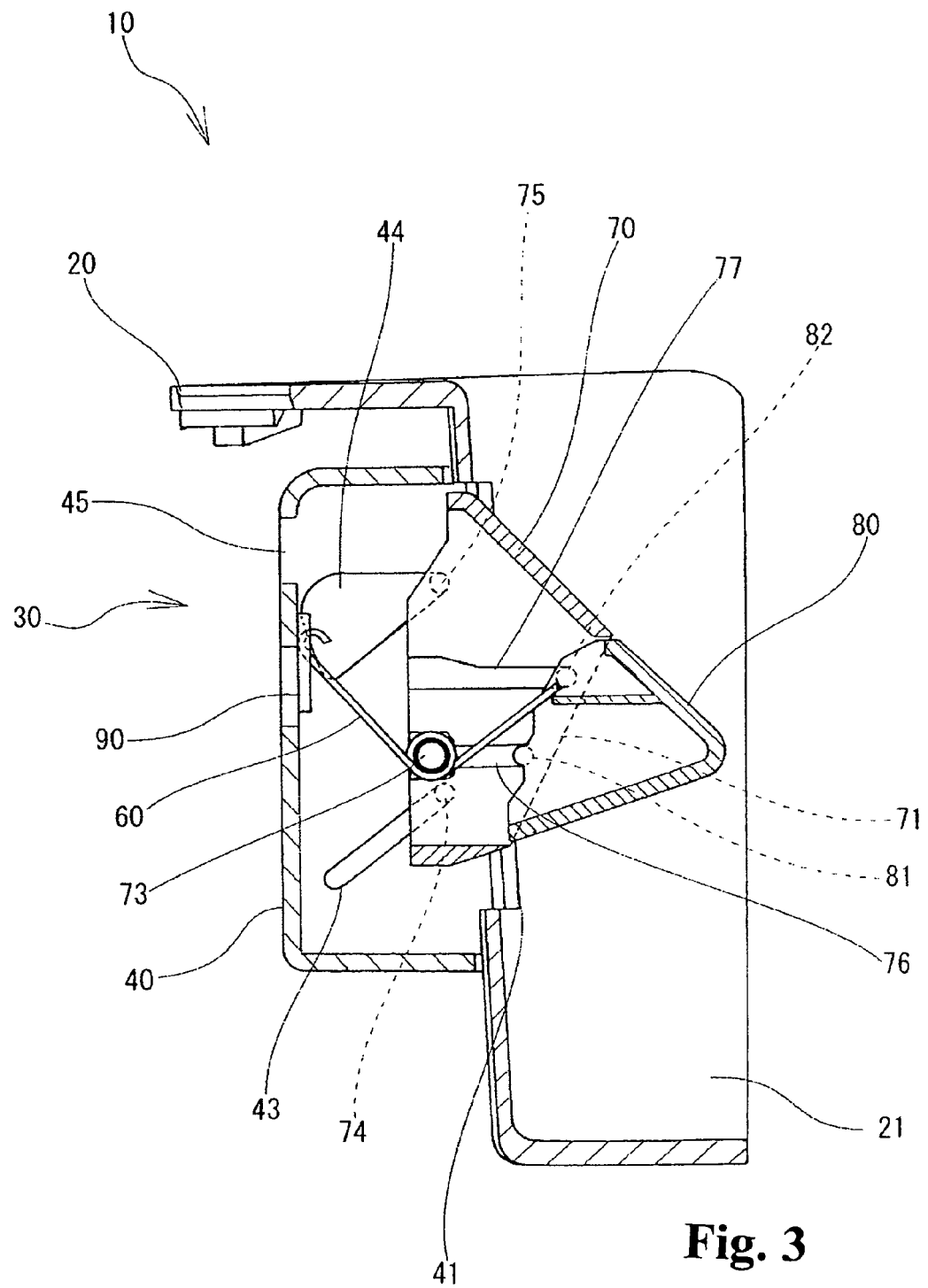
FIG. 3 is another partial cross-sectional view of the cup holder, corresponding to FIG. 2.

The cup holder 10 generally has the following parts, as illustrated in FIGS. 1 to 3.

The following (1) and (2) are described later.

(1) Cup holder body 20

(2) Diameter acceptance mechanism 30 The parts of the cup holder 10 are not limited to the abovementioned (1) and (2).

(Cup Holder Body 20)

Figure 4:
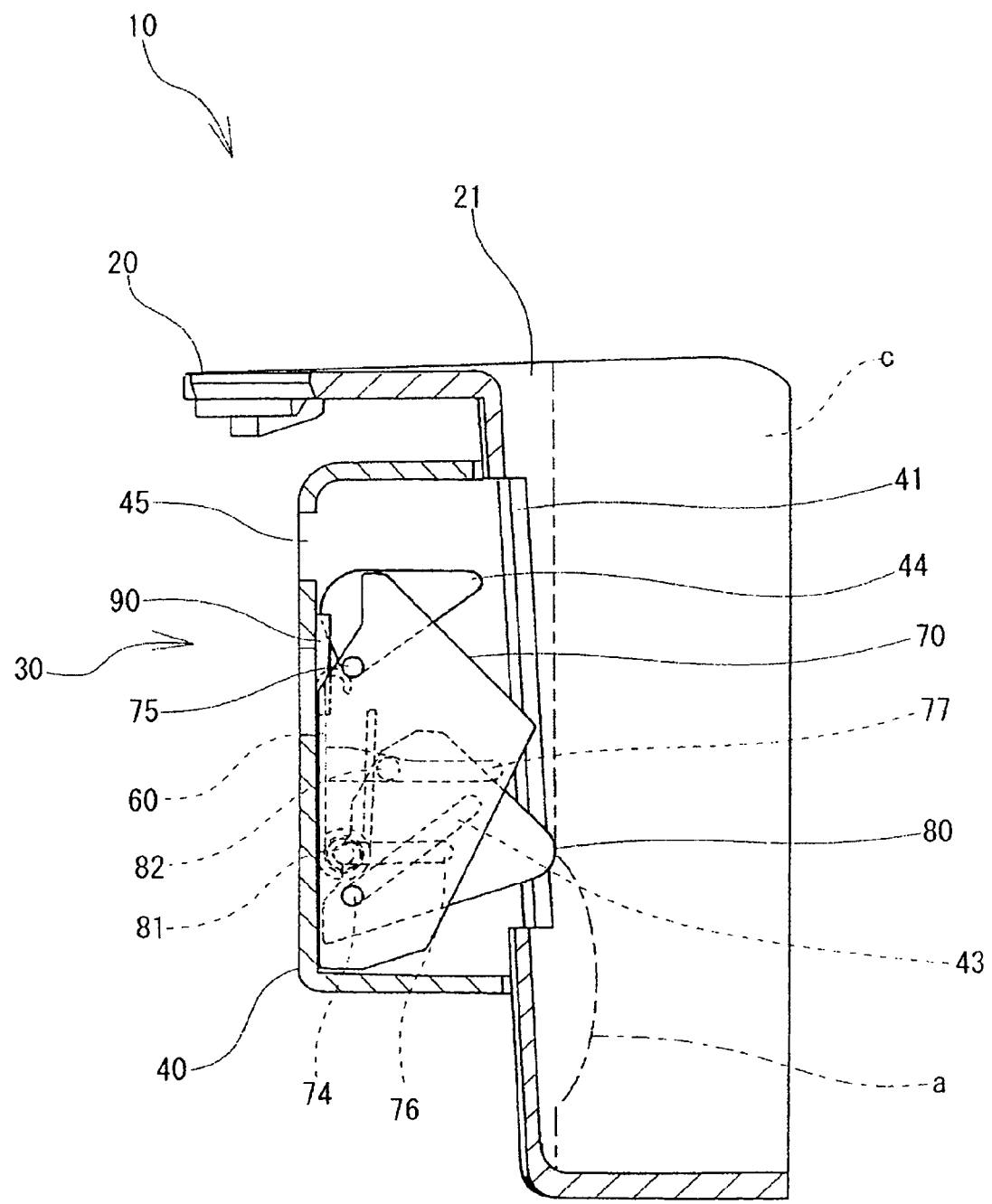
FIG. 4 is a partial cross-sectional view of the cup holder for describing the state in which the contact member of the diameter acceptance mechanism was drawn in, corresponding to FIG. 2.
Figure 5:
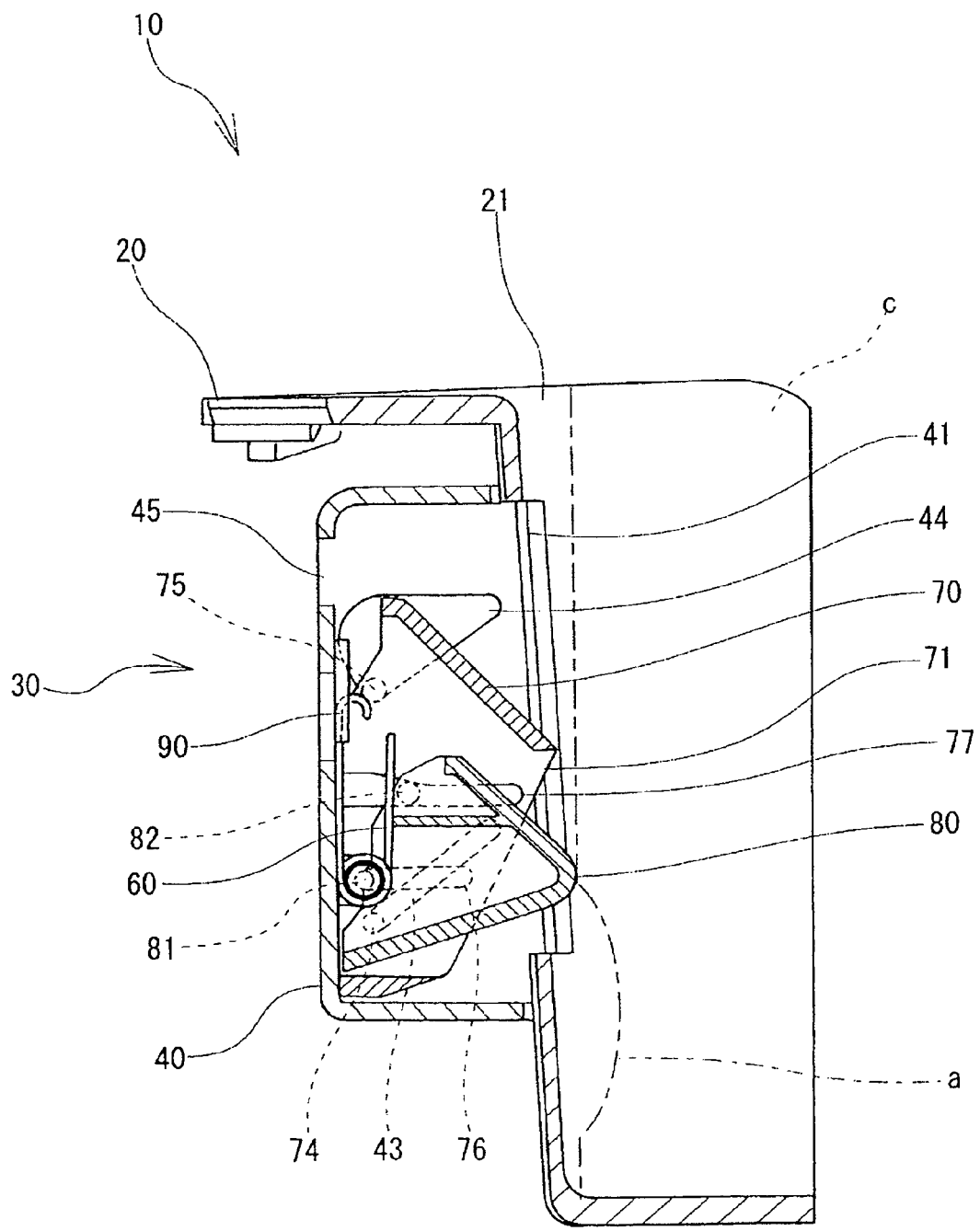
FIG. 5 is another partial cross-sectional view of the cup holder, corresponding to FIG. 4.

The cup holder body 20 has a cup insertion part 21 into which a cup C can be inserted, as illustrated in FIGS. 4 and 5. The cup insertion part 21 is formed in a cylindrical shape having an open upper face and having a bottom, and the inner diameter is set in conformance with the maximum outer diameter of the cup C.

The cup insertion part 21 is formed in a cylindrical shape having a bottom, but the shape is not limited to this, and a bottomless hole form also may be formed.

Also, the cup holder body 20 is fixed inside a vehicle compartment not illustrated.

(Diameter Acceptance Mechanism 30)

The diameter acceptance mechanism 30 is installed on the cup holder body 20, as illustrated in FIGS. 1 to 5, and is used for restricting movement in the diameter direction of the cup C inserted into the cup insertion part 21 and preventing rattling of the cup C.

The diameter acceptance mechanism 30 generally has the following parts, as illustrated in FIGS. 1 to 3.

The followings (1) to (3) are described later.

(1) Base 40

(2) Contact member 50

(3) Torsion coil spring 60 (urging device)

The parts of the diameter acceptance mechanism 30 are not limited to the abovementioned (1) to (3).

(Base 40)

The base 40 is fixed to the cup holder 10, and has an open part 41 facing the cup insertion part 21 of the cup holder 10, as illustrated in FIGS. 1 to 3.

Specifically, the base 40 is formed in a hollow box form, long from top to bottom, having an open part 41 on a front face, and having upper and lower faces, left and right side faces, and a rear face surrounded by walls, as illustrated in FIGS. 1 to 3.

The base 40 is provided with each of the following parts, in addition to the open part 41, as illustrated in FIGS. 1 to 3.

The parts of the base 40 are not limited to the following (1) to (4).

(1) Installation Pieces 42

Four installation pieces 42 in total are disposed above and below, extending outward in pairs from both the left and right sides, that is, both the left and right side walls, of the open part 41, as illustrated in FIG. 1. The installation pieces 42, although not illustrated, are used for fixing the base 40 to the cup holder body 20.

(2) First Slots 43

The first slots 43 are used for movably holding a first flap member 70 of a contact member 50, to be described, as illustrated in FIGS. 1 to 3. The first slots 43 run through both side walls from front to back, and extend for a length following the direction of movement of the first flap member 70 with a constant slot width. Specifically, the first slots 43 incline diagonally downward from the side of the open part 41 toward the side of the rear face.

(3) Second Slots 44

The second slots 44 are positioned on the side above the first slots 43 as illustrated in FIGS. 1 to 3, and are used for movably supporting the first flap member 70 in concert with the first slots 43. The second slots 44 run through both side walls from front to back in the same manner as the first slots 43, and the lower edges thereof incline diagonally downward from the side of the open part 41 toward the side of the rear face in parallel with the first slots 43. The upper edges of the second slots 44 are raised as semicircles.

(4) Cutout Part 45

The cutout part 45 is formed on the upper part of the rear face, and is formed in a rectangular form, long from left to right, running through the rear wall from front to back, as illustrated in FIGS. 1 to 3.

(Contact Member 50)

The contact member 50 is supported movably into and out from the open part 41 of the base 40, as illustrated in FIGS. 1 to 3, and is projected into the cup insertion part 21 to contact with an outer perimeter of a cup C inserted into the cup insertion part 21.

The contact member 50 is assembled and unitized on the base 40 together with a torsion coil spring 60 (urging device) to be described.

Specifically, the contact member 50 has at least the following configuration.

The following (1) and (2) are described later.

(1) First flap member 70

(2) Second flap member 80

The parts of the contact member 50 are not limited to the abovementioned (1) and (2). Also, the contact member 50 is projected in two stages, being the first and second flap members 70 and 80, but the number is not limited to this, and three or more stages also may be used.

(Torsion Coil Spring 60 (Urging Device))

One torsion coil spring 60 is used, being disposed between the base 40 and the contact member 50, as illustrated in FIGS. 1 to 3, and is one example of the urging device for urging the contact member 50 in a direction to project from the open part 41.

Specifically, one end part of the torsion coil spring 60 contacts with the base 40, and another end part contacts with the second flap member 80, as illustrated in FIGS. 1 to 3.

That is, a cylindrical part in the center of the torsion coil spring 60 is supported on spring support shafts 73 of the first flap member 70 to be described, as illustrated in FIGS. 1 to 3.

One end part of the torsion coil spring 60 is bent into a key shape, and contacts with the inner face of the rear wall of the base 40, as illustrated in FIGS. 1 to 3. Also, a cushion member 90 is affixed on the inner face of the rear wall of the base 40 contacts with the one end part of the torsion coil spring 60, as illustrated in FIGS. 2 and 3. The cushion member 90 is elastically contacted by the one end part of the torsion coil spring 60, whereby generation of a strange sound is prevented.

Another end part of the torsion coil spring 60 contacts with a fourth shaft 82 of the second flap member 80 to be described, as illustrated in FIGS. 1 to 3.

A torsion coil spring 60 is given as an example of the urging device, but the urging device is not limited to this, and a sheet spring, or the like, also may be used. Also, one torsion coil spring 60 is used, but the number is not limited to this, and a plurality also may be used.

(First Flap Member 70)

The first flap member 70 is a hollow article supported movably into and out from the open part 41 of the base 40 and provided with a projection orifice 71 facing the cup insertion part 21, as illustrated in FIGS. 1 to 3.

Specifically, the first flap member 70 is formed in a roughly trapezoidal form when viewed from the side face, having an open rear face and becoming narrower going forward toward the projection orifice 71.

The first flap member 70 is provided with each of the following parts, in addition to the projection orifice 71, as illustrated in FIGS. 1 to 3.

The parts of the first flap member 70 are not limited to the following (1) to (6).

(1) Hollow Part 72

The hollow part 72 is formed on the inside of the first flap member 70, and is capable of storing the second flap member 80, as illustrated in FIGS. 1, 3, and 5.

(2) Spring Support Shafts 73

The spring support shafts 73 project mutually oppositely from the inner faces of the left and right side walls toward the hollow part 72, as illustrated in FIG. 1. The left and right spring support shafts 73 are attached by inserting from both ends of the cylindrical part in the center of the torsion coil spring 60.

(3) First Shafts 74

The first shafts 74 project mutually oppositely from the outer faces of the left and right side walls, as illustrated in FIGS. 1 to 3. The first shafts 74 are fitted into the first slots 43 of the base 40, and move following the first slots 43.

(4) Second Shafts 75

The second shafts 75 are positioned on the side above the first shafts 74, and project mutually oppositely from the outer faces of the left and right side walls in the same manner as the first shafts 74, as illustrated in FIGS. 1 to 3. The second shafts 75 are fitted into the second slots 44 of the base 40, and move following the second slots 44.

In the position when the first shafts 74 are positioned at the fronts of the first slots 43 and the second shafts 75 are positioned at the fronts of the second slots 44, the first flap member 70 is projected to a maximum length from the open part 41 of the base 40, as illustrated in FIGS. 2 and 3.

As opposed to this, in the position when the first shafts 74 are positioned at the rears of the first slots 43 and the second shafts 75 are positioned at the rears of the second slots 44, the first flap member 70 is drawn inward from the open part 41 of the base 40, and is stored inside the base 40, as illustrated in FIGS. 4 and 5.

Figure 6:
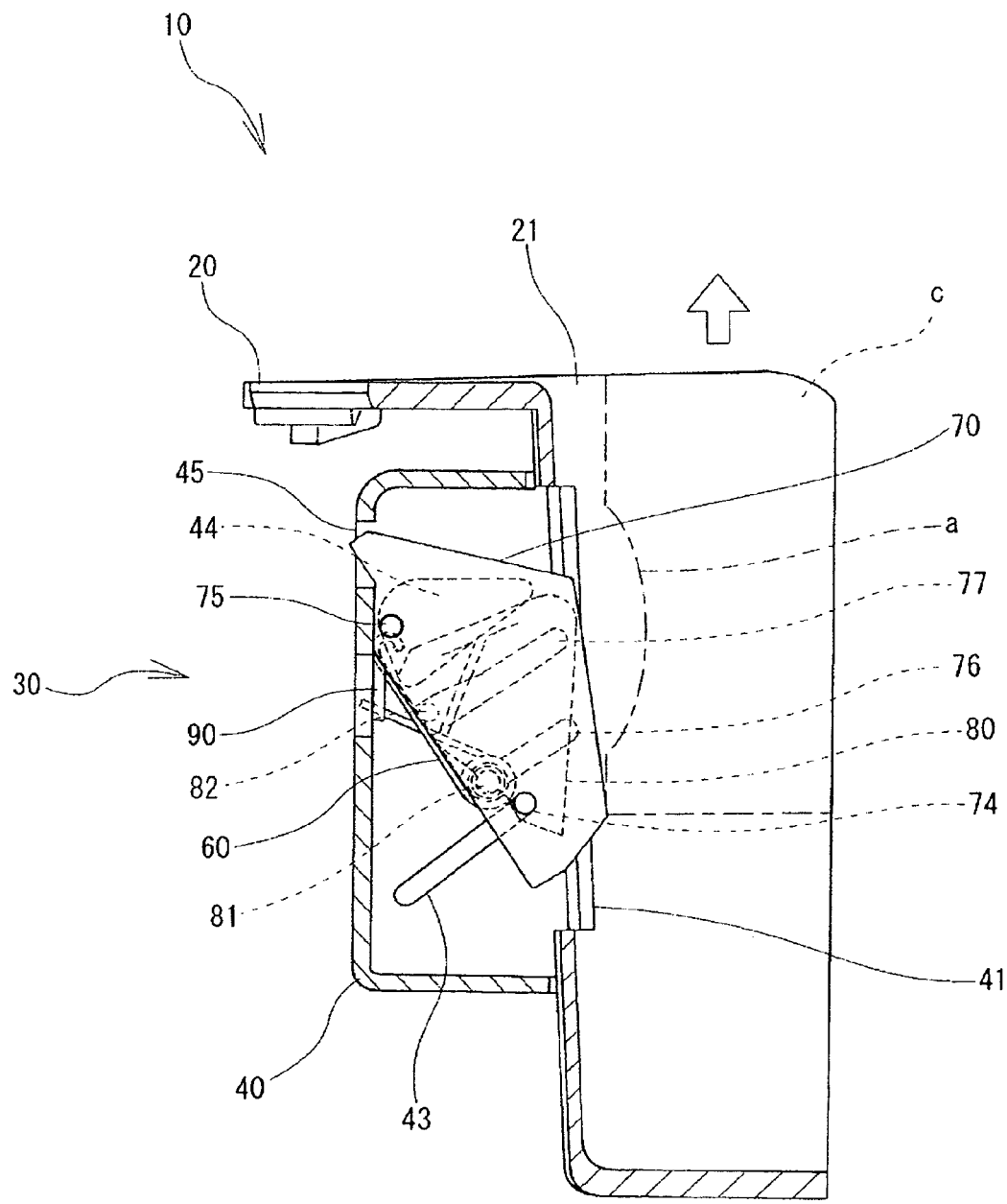
FIG. 6 is a partial cross-sectional view of the cup holder for describing the operating state of the diameter acceptance mechanism when a cup having a constricted part was pulled out, corresponding to FIG. 2.
Figure 7:
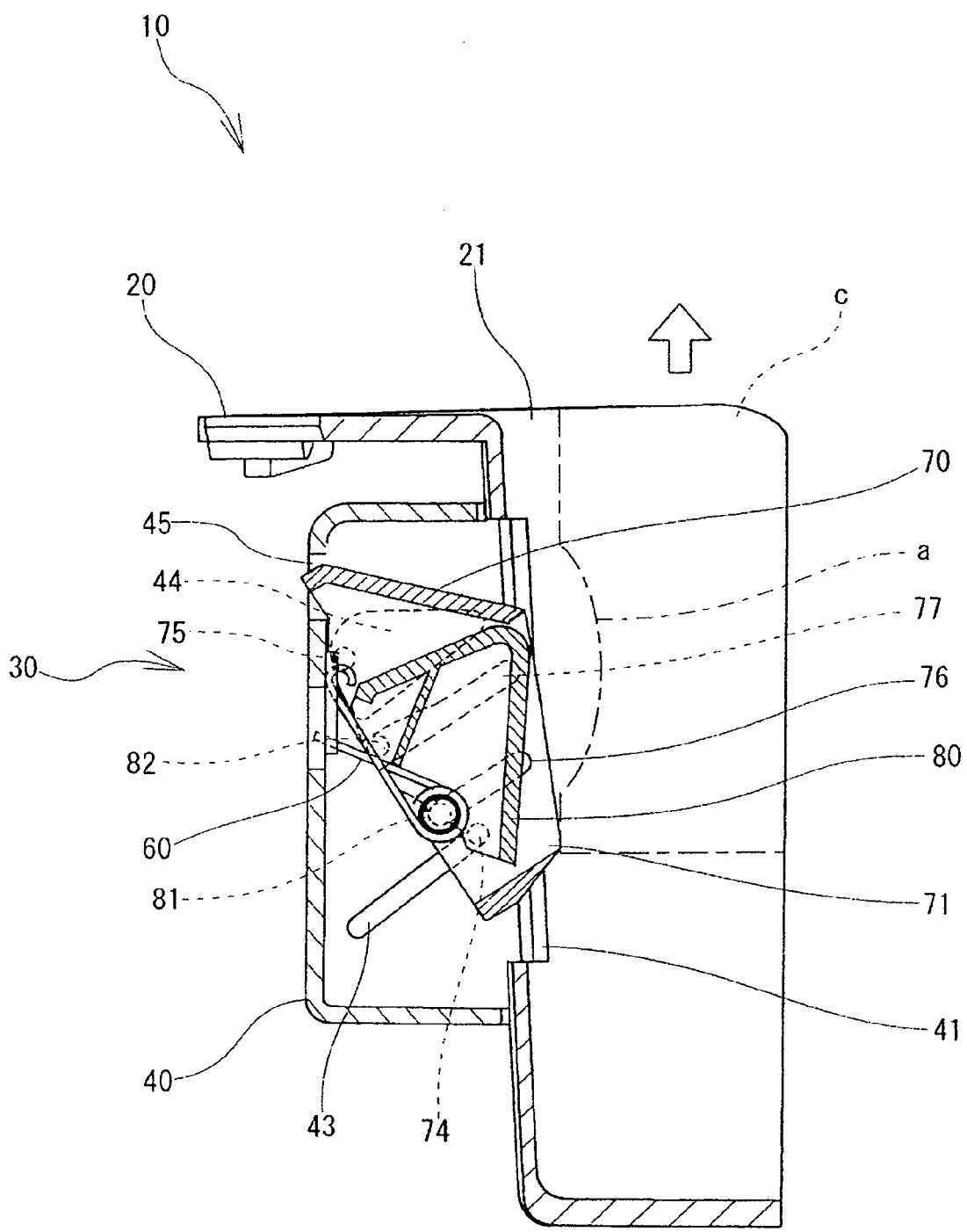
FIG. 7 is another partial cross-sectional view of the cup holder, corresponding to FIG. 6.

On the other hand, in the position when the first shafts 74 are positioned at the fronts of the first slots 43 and the second shafts 75 are positioned at the rears of the second slots 44, the first flap member 70 rotates upward centered on the first shafts 74, as illustrated in FIGS. 6 and 7. At this time, a part toward the upper side of the rear end part of the first flap member 70 is fitted into the cutout part 45 of the base 40.

(5) Third Slots 76

The third slots 76 are used for movably supporting the second flap member 80 to be described, as illustrated in FIGS. 1 to 3. Specifically, the third slots 76 are formed mutually oppositely on the inner faces of the left and right side walls, and extend for a length following the direction of movement of the second flap member 80 with a constant slot width. Specifically, the third slots 76 are formed nearly horizontally.

(6) Fourth Slots 77

The fourth slots 77 are used for movably supporting the second flap member 80 to be described, in concert with the third slots 76, as illustrated in FIGS. 1 to 3. Specifically, the fourth slots 77 are positioned on the side above the third slots 76, are formed mutually oppositely on the inner faces of the left and right side walls in the same manner as the third slots 76, and are formed in parallel with the third slots 76.

The slot width on the rear end parts of the fourth slots 77 is formed wider, as illustrated in FIGS. 2 and 3.

(Second Flap Member 80)

The second flap member 80 is fitted into the hollow part 72 of the first flap member 70 and supported movably into and out from the projection orifice 71, as illustrated in FIGS. 1 to 5, and is projected from the projection orifice 71 to contact with an outer perimeter of a cup C inserted into the cup insertion part 21.

Specifically, the second flap member 80 is formed in a roughly triangular form when viewed from the side, having an open rear face and becoming narrower going forward.

The second flap member 80 is provided with each of the following parts, as illustrated in FIGS. 1 to 3.

The parts of the second flap member 80 are not limited to the following (1) and (2).

(1) Third Shafts 81

The third shafts 81 project mutually oppositely from the outer faces of the left and right side walls, as illustrated in FIGS. 1 to 3. The third shafts 81 are fitted into the third slots 76 of the first flap member 70, and move following the third slots 76.

(2) Fourth Shafts 82

The fourth shafts 82 are positioned to the front on the side above the third shafts 81, and project mutually oppositely from the outer faces of the left and right side walls 71 in the same manner as the third shafts 81, as illustrated in FIGS. 1 to 3. The fourth shafts 82 are fitted into the fourth slots 77 of the first flap member 70, and move following the fourth slots 77.

In the position when the third shafts 81 are positioned at the fronts of the third slots 76 and the fourth shafts 82 are positioned at the fronts of the fourth slots 77, the second flap member 80 is projected to a maximum limit from the projection orifice 71 of the first flap member 70, as illustrated in FIGS. 2 and 3.

As opposed to this, in the position when the third shafts 81 are positioned at the rears of the third slots 76 and the fourth shafts 82 are positioned at the middles of the fourth slots 77, the second flap member 80 is drawn inward from the projection orifice 71 of the first flap member 70, and is stored inside the hollow part 72 of the first flap member 70, as illustrated in FIGS. 4 and 5.

On the other hand, in the position when the third shafts 81 are positioned at the rears of the fourth shafts 82 and the fourth shafts 82 are positioned at the rears of the fourth slots 77, the second flap member 80 rotates upward centered on the third shafts 81, as illustrated in FIGS. 6 and 7. At this time, the fourth shafts 82 are positioned at the upper edges of the rear end parts having widened slot width of the fourth slots 77.

Operating Example 1

Operating example 1, being one example of the operating states of a diameter acceptance mechanism 30 having the above-described configuration, is next described using FIGS. 2 and 3.

First, in the state in which a cup C is not inserted in the cup insertion part 21 of the cup holder body 20, the first and second flap members 70 and 80 are projected in two stages toward the maximum limits inside the cup insertion part 21, as illustrated in FIGS. 2 and 3, by the spring force of the torsion coil spring 60 (urging device).

Operating Example 2

Operating example 2, being another example of the operating states of the diameter acceptance mechanism 30, is described using FIGS. 4 and 5.

When a cup C having a comparatively large diameter is inserted into the cup insertion part 21, the second flap member 80 is pressed against the outer perimeter thereof, and the second flap member 80 is drawn inward from the open part 41 of the base 40 while being fitted in nested form inside the hollow part 72 of the first flap member 70, and is stored inside the base 40.

At this time, the second flap member 80 elastically contacts with the outer perimeter of the cup C by the spring force of the torsion coil spring 60 (urging device), whereby rattling of the cup C inside the cup insertion part 21 is prevented.

Operating example 3

Operating example 2 [3], being a different example of the operating states of the diameter acceptance mechanism 30, is described using FIGS. 6 and 7.

First, there is a case in which there is a constricted part a indented in arc form on the outer perimeter of the cup C, as illustrated in FIGS. 6 and 7.

When a cup C having a constricted part a is inserted into the cup insertion part 21, although not illustrated, a portion where the constricted part a is absent is pressed, and the first flap member 70 is drawn inward in opposition to the spring force of the torsion coil spring 60 (urging device). Also, at the position where the constricted part a and the first flap member 70 coincide, the first flap member 70 is once projected by the spring recovery force of the torsion coil spring 60 (urging device).

When the cup C is inserted further into the cup insertion part 21 thereafter, the constricted part a passes by the first flap member 70 as illustrated in FIGS. 4 and 5. The once projected first flap member 70 is therefore pressed to the outer perimeter of a portion of the cup C where the constricted part a is absent, and is again drawn inward.

Conversely, when the cup C having the constricted part a is pulled out from the cup insertion part 21, although not illustrated, the first flap member 70 is once projected by the spring recovery force of the torsion coil spring 60 (urging device) at the position where the constricted part a and the first flap member 70 coincide.

At this time, the projected first flap member 70 is caught in a state being fitted into the constricted part a of the cup C, and opposes the force in the direction of removal of the cup C.

When the cup C is pulled out with a stronger force, the first and second flap members 70 and 80 rotate upward as illustrated in FIGS. 6 and 7, whereby the projected first flap member 70 is moved away so as to escape from the constricted part a of the cup C.

Therefore, by adopting a configuration in which the first and second flap members 70 and 80 rotate, there is an advantage that the force for pulling out a cup C having a constricted part a can be lessened significantly, compared with a case in which the first and second flap members 70 and 80 are not rotated.

The entire contents of the specification, claims, drawings, and abstract of Japanese Patent Application No. 2009-089570 filed on Apr. 1, 2009 are incorporated by reference herein as a disclosure of the specification of the present invention.

What is claimed is:

1. A diameter acceptance mechanism for a cup holder, comprising:
   a base fixed to the cup holder and having an open part facing a cup insertion part of the cup holder;
   a contact member supported movably into and out from said open part of said base, and projecting into said cup insertion part adapted to contact with an outer perimeter of a cup inserted into the cup insertion part; and
   an urging device disposed between said base and said contact member, for urging said contact member in a direction to project from said open part;
   wherein the contact member includes at least:
   a hollow first flap member supported movably into and out from said open part of said base and having a projection orifice facing said cup insertion part; and
   a second flap member fitted into a hollow part of said first flap member and supported movably into and out from said projection orifice, the second flap member projecting from said projection orifice adapted to contact with the outer perimeter of the cup inserted into said cup insertion part,
   wherein said first flap member includes slots, and said second flap member includes shafts projecting outwardly from side surfaces of the second flap member and slidably engaging the slots so that when the second flap member is pushed into the first flap member, the shafts enter inside the slots, and
   said urging device is a coil spring having a coil portion retained in the first flap member, a first end contacting the base, and a second end contacting the second flap member.

2. A diameter acceptance mechanism for a cup holder according to claim 1, wherein said contact member and said urging device are assembled on said base to form a unit.

3. A diameter acceptance mechanism for a cup holder according to claim 1, wherein said base includes a slot and a semicircular slot situated above the slot, and the first flap member includes first and second shafts projecting outwardly from outer surfaces of the first flap member, the first shaft slidably engaging the slot and the second shaft slidably engaging the semicircular slot to move along an edge of the semicircular slot.

4. A cup holder comprising:
   a cup holder main body, and
   a diameter acceptance mechanism including:
   a base fixed to the cup holder and having an open part facing a cup insertion part of the cup holder;
   a contact member supported movably into and out from said open part of said base, and projecting into said cup insertion part adapted to contact with an outer perimeter of a cup inserted into the cup insertion part; and
   an urging device disposed between said base and said contact member, for urging said contact member in a direction to project from said open part;
   wherein the contact member includes at least:
   a hollow first flap member supported movably into and out from said open part of said base and having a projection orifice facing said cup insertion part; and
   a second flap member fitted into a hollow part of said first flap member and supported movably into and out from said projection orifice, the second flap member projecting from said projection orifice adapted to contact with the outer perimeter of the cup inserted into said cup insertion part, wherein said first flap member includes slots, and said second flap member includes shafts projecting outwardly from side surfaces of the second flap member and slidably engaging the slots so that when the second flap member is pushed into the first flap member, the shafts enter inside the slots, and said urging device is a coil spring having a coil portion retained in the first flap member, a first end contacting the base, and a second end contacting the second flap member.

* * * * *